US008719946B2

(12) United States Patent
Marshall

(10) Patent No.: US 8,719,946 B2
(45) Date of Patent: May 6, 2014

(54) SYSTEM AND METHOD FOR SECURELY RETRIEVING AND PLAYING DIGITAL MEDIA

(75) Inventor: Marvin Marshall, HideAway, TX (US)

(73) Assignee: Song1, LLC, HideAway, TX (US)

(*) Notice: Subject to any disclaimer, the term of this patent is extended or adjusted under 35 U.S.C. 154(b) by 0 days.

(21) Appl. No.: 13/412,035

(22) Filed: Mar. 5, 2012

(65) Prior Publication Data
US 2013/0232581 A1 Sep. 5, 2013

(51) Int. Cl.
G06F 7/04 (2006.01)
G06F 21/10 (2013.01)
G06F 21/60 (2013.01)

(52) U.S. Cl.
CPC ........ G06F 21/10 (2013.01); G06F 2221/0748 (2013.01); G06F 21/60 (2013.01)
USPC .......................................................... 726/26

(58) Field of Classification Search
CPC .. G06F 2221/0748; G06F 21/60; G06F 21/10
USPC .......................................................... 726/26
See application file for complete search history.

(56) References Cited

U.S. PATENT DOCUMENTS

| 6,163,683 | A | 12/2000 | Dunn et al. |
| 6,192,340 | B1 | 2/2001 | Abecassis |
| 6,526,456 | B1* | 2/2003 | Allan et al. ................... 719/328 |
| 6,647,417 | B1* | 11/2003 | Hunter et al. ................. 709/225 |
| 7,058,376 | B2 | 6/2006 | Logan et al. |
| 7,058,722 | B2 | 6/2006 | Ikami et al. |
| 7,171,480 | B2 | 1/2007 | Chatani |
| 7,194,617 | B2 | 3/2007 | Weimerskirch |
| 7,237,123 | B2 | 6/2007 | LeVine et al. |
| 7,263,648 | B2 | 8/2007 | Blackburn |
| 7,385,131 | B2 | 6/2008 | Clift |
| 7,430,633 | B2 | 9/2008 | Church et al. |
| 7,545,946 | B2 | 6/2009 | Melanson |
| 7,584,291 | B2 | 9/2009 | McDowall |
| 2002/0076048 | A1 | 6/2002 | Hars |
| 2002/0144153 | A1* | 10/2002 | LeVine et al. ................ 713/201 |
| 2003/0079222 | A1 | 4/2003 | Boykin et al. |
| 2004/0260559 | A1* | 12/2004 | Kentish et al. ................ 704/273 |
| 2006/0179153 | A1* | 8/2006 | Lee et al. ..................... 709/231 |

(Continued)

OTHER PUBLICATIONS

Chris Davies, Amazon Disc+ on demand gets 10,000 new titles, 2010, Retrieved from the Internet <URL: .slashgear.com/amazon-disc-on-demand-gets-10000-new-titles-02111788/>, pp. 1-4 as printed.*

(Continued)

Primary Examiner — Michael Chao
(74) Attorney, Agent, or Firm — Michael P. Mazza, LLC

(57) ABSTRACT

A system for securely downloading and playing coherent digital content such as music and preventing its play by unauthorized users. The system may include mass server/storage devices for receiving and storing digital content having predetermined gaps; and client devices communicating with the server/storage devices, and providing authorization to proceed. During playing of the digital content by the client devices, the missing gaps may be filled into the appropriate places, to allow the play of the coherent digital content.

15 Claims, 3 Drawing Sheets

(56) References Cited

U.S. PATENT DOCUMENTS

| | | | |
|---|---|---|---|
| 2006/0195909 A1* | 8/2006 | Boswell et al. | 726/26 |
| 2007/0289026 A1* | 12/2007 | Newcombe et al. | 726/29 |
| 2008/0037718 A1 | 2/2008 | Logan | |
| 2008/0133767 A1 | 6/2008 | Birrer et al. | |
| 2008/0172718 A1 | 7/2008 | Bradley | |
| 2008/0215172 A1 | 9/2008 | Digon | |
| 2009/0083631 A1 | 3/2009 | Sidi et al. | |
| 2009/0328227 A1* | 12/2009 | Cook et al. | 726/26 |
| 2010/0046553 A1 | 2/2010 | Daigle et al. | |
| 2010/0161756 A1 | 6/2010 | Lewis et al. | |
| 2011/0113122 A1 | 5/2011 | Drope | |
| 2012/0109784 A1* | 5/2012 | Marion | 705/27.1 |
| 2012/0117659 A1* | 5/2012 | Gearhart et al. | 726/27 |
| 2012/0222138 A1* | 8/2012 | Aaron | 726/30 |
| 2012/0259994 A1* | 10/2012 | Gillies et al. | 709/231 |

OTHER PUBLICATIONS

Mark Hachman, Amazon Discounts COD:MW3 Digital Download via $10 Promo, 2011, Retrieved from the Internet <URL: pcmag.com/article2/0,2817,2395858,00.asp>, p. 1 as printed.*

Dutta et al., Perceptible Audio Watermarking for Digital Right Management Control, 2009, Retrieved from the Internet <URL: ieeexplore.ieee.org/xpls/abs_all.jsp?arnumber=5397484>, pp. 1-5 as printed.*

Dutta et al., Perceptible Audio Watermarking for Digital Right Management Control, 2009, Retrieved from the Internet <URL: ieeexplore.ieee.org/xpls/abs_all.jsp?arnumber=5397484>, pp. 1-5.*

Malay Kishoredutta, Phalguni Gupta, Vinay K. Pathak Perceptible Audio Watermarking for Digital Right Management Control Department of Electronics Engineering GCET Greater NOIDA, India, Department of CSE, 2009.

* cited by examiner

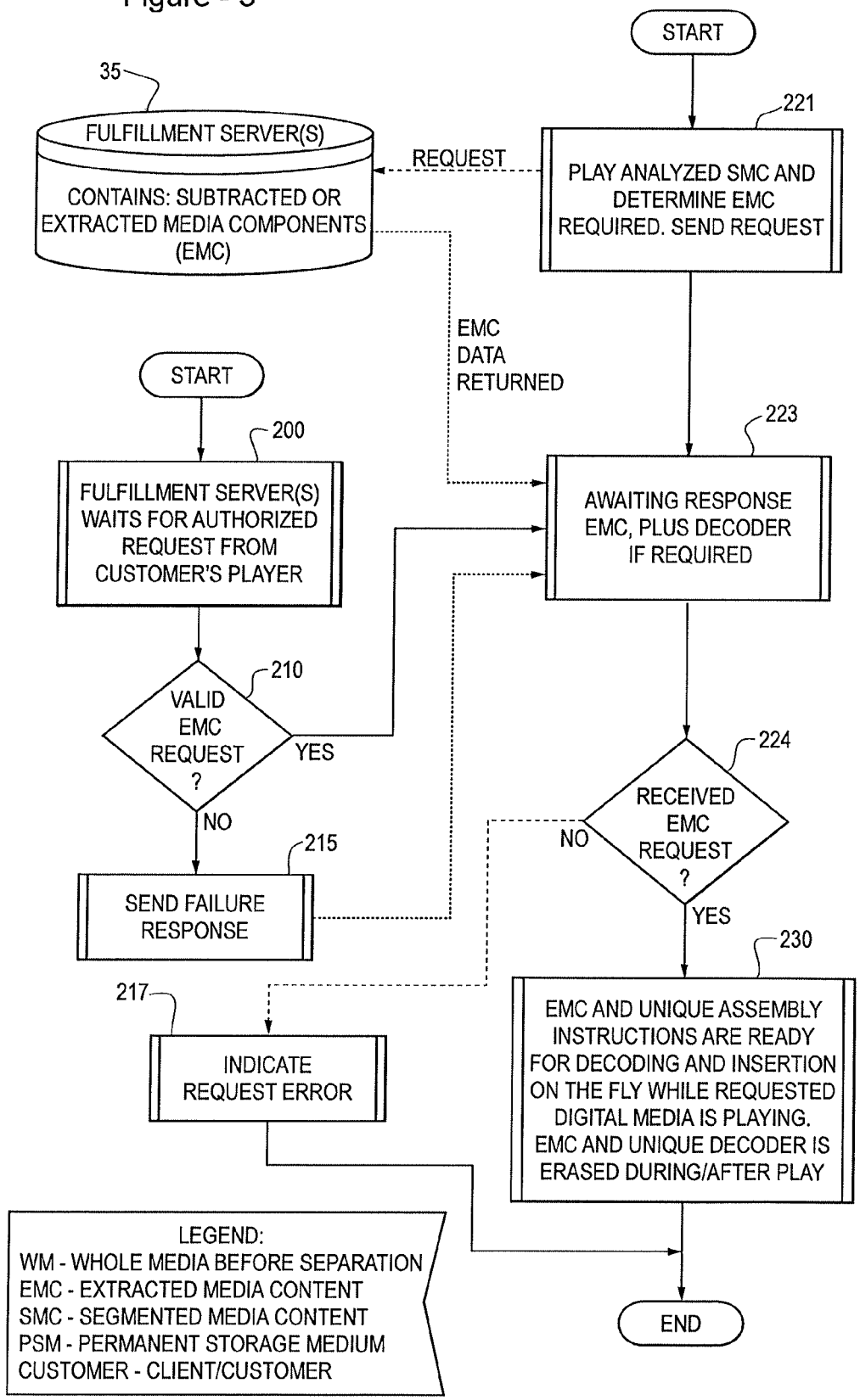

SYSTEM AND METHOD FOR SECURELY RETRIEVING AND PLAYING DIGITAL MEDIA

BACKGROUND OF THE INVENTION

The present invention generally relates to a virtual "digital music box or media box," i.e., an apparatus and method for retrieving and playing songs. More specifically, the invention is directed to such an apparatus and method that permits downloading via the Internet only the missing segments of songs or media to be selectively added to matching song or media previously purchased in a physical media, for example.

The sale and distribution of music in many varying forms (e.g., by playing the music on records, 8-track tapes, Sony Walkmans and Apple i-Pods) and mediums (e.g., radio, television, phone, computer) is a huge business. Music, movie, book lovers, etc. have long sought ever more expedient and economical ways to enjoy digital content. Unfortunately, this has often led to unauthorized copying of these copyrighted digital products, which if left unchecked disincentivizes authors and owners from involving themselves in the creative development for the digital industry.

A huge and growing way that listeners enjoy music is to download the music over the Internet and onto a medium that can play the music, such as a phone, i-Pod, computer, etc. Many patents and commercially available devices have sought to prevent the unauthorized copying of music downloaded over the Internet or other mediums in different ways. Some have disclosed providing the music with a digital "watermark" which can be verified, such as U.S. Pat. No. 7,194,617 to Weimerskirch. This method would require relatively expensive and time-consuming instruments and/or software for checking for the digital watermarks in order to prevent unauthorized copying. Others have sought to inhibit the illicit stitching together of downloads by adding disruptions such as silence gaps, as disclosed in U.S. Patent Publication No. 2002/0076048 to Hars. The problem with Hars, or other similar attempts to stop or discourage piracy, is that the entire digital content is in the hands of the consumer and/or pirate experts. Pirate experts in this field can identify watermark or similar identifiers and defeat them. Alternatively, at a minimum, pirate experts can create a codec that will make it playable even with the watermark left intact. In short, if the complete digital content is allowed to be in the possession of the consumer, it will be compromised.

Accordingly, it would be highly advantageous to provide an expedient and economical way for listeners to enjoy digital content in a manner that delivers the highest of quality, is not limited by bandwidth, and protects the industry, while at the same time reducing the present clogging of the Internet and preventing unauthorized copying of the digital content in a fast, reliable and cost-efficient manner. It would also be advantageous to provide this without requiring new player technology in order to function and safeguard the digital industry. (See http://en.wikipedia.org/wiki/Secure_Digital_Music_Initiative (explaining the failure of SDMI, the Secure Digital Music Initiative).

DEFINITION OF CLAIM TERMS

The following terms are used in the claims of the patent as filed and are intended to have their broadest meaning consistent with the requirements of law. Where alternative meanings are possible, the broadest meaning is intended. All words used in the claims are intended to be used in the normal, customary usage of grammar and the English language.

"Coherent" or "whole" media means the entire digital content, whether it is musical content such as song or other digital content such as films, text, images, etc. When "coherent" or "whole" media is played, both the RSMC and the EMC (i.e., any missing gaps including temporarily placed foreign parts filled or replaced into the digital content in its appropriate order) is played. Upon extracting segments from the original "coherent" or "whole" media, (e.g.) two or more bodies of digital media remain, and they are incoherent until rejoined when played. The portion(s) which are removed are referred to here as Extracted Media Components (EMC). The remaining body with the missing or inserted foreign parts is referred to as the Segmented Media Content (SMC). The word "gaps" can mean either missing or inserted foreign parts.

"Extracted Media Components" (EMC) means the digital media content portion(s) which is/are removed from the original coherent or whole digital media content.

"Fulfillment server" means the server(s) which has the coherent or whole digital media content stored on, or readily accessible by, the server(s), as well as the algorithms for providing the EMC and RSMC.

"Incoherent" means incomplete digital content, with missing gaps.

"Segmented Media Content" (SMC) means the digital media content which remains, including the missing and/or inserted foreign material (the "missing gaps"), after removal of the Extracted Media Components.

SUMMARY OF THE INVENTION

The objects mentioned above, as well as other objects, are solved by the present invention, which overcomes disadvantages of prior devices and methods for retrieving digital media content such as music over the Internet and playing it while preventing unauthorized copying, while providing new advantages not previously obtainable with such devices and methods.

In a preferred embodiment, a system is provided for securely downloading and playing coherent digital content, such as music or other digital content, and preventing its play by unauthorized users. The coherent digital content includes extracted media content and remaining segment media content. Preferably, one or more mass storage devices, which may involve or communicate with one or more servers, receive and store incoherent digital content that includes the extracted media content having predetermined gaps in the digital content. One or more client devices, such as computers or other digital devices, communicate with the one or more storage devices and/or servers. The one or more client devices have downloaded (e.g., via a previous purchase) and may store the remaining segmented media content; they now may also receive the corresponding extracted media content upon providing authorization of entitlement to receive the coherent digital content. Now, the coherent digital content may be played by the one or more authorized client devices, by reassembling the extracted media content with the remaining segmented media.

Preferably, for security reasons, the extracted media content is not stored on the one or more client devices, or is erased from the one or more client devices during or shortly after playing the coherent digital content. Instead, the mass storage devices and/or servers may save the extracted media content necessary to form the coherent digital content.

One or more algorithms may be provided for applying information concerning the number and location of the predetermined gaps to enable reassembly of the extracted media content with the corresponding remaining segmented media content. Again, preferably, the extracted media content with the predetermined gaps, as well as the reassembly algorithm for playing the coherent digital content, is erased from or otherwise available to the one or more client devices after playing of the coherent digital content.

In a preferred embodiment, the remaining segmented media content may be contained on physical storage medium, such as discs, DVDs, solid-state chips, etc. The physical storage medium may be distributed to consumers purchasing a license to use the coherent digital media corresponding to the remaining segmented media content.

Preferably, one or more fulfillment servers having the extracted media content are used. One or more distribution servers may also be used for facilitating the distribution of the remaining segmented media content to authorized users.

In another preferred embodiment, a method is provided for securely downloading and playing digital content and preventing its play by unauthorized users. Authorized coherent digital content may first be assembled. Next, the coherent digital content for each individual digital media content, such as a song, may be disassembled into extracted media content, and corresponding remaining segmented media content having predetermined gaps corresponding to the extracted media content. The remaining segmented media content may be distributed to (purchasing) authorized customers. When a customer request is received to play the coherent digital content, and the customer is authenticated as an authorized user, the corresponding extracted media content may be transmitted contemporaneous with receipt of a customer request to play the coherent digital content for a particular remaining segmented media content.

A reassembly algorithm for indicating the number and location of the predetermined gaps may be provided. Preferably, the extracted media content and the reassembly algorithm are not made available, for security reasons, to at least the one or more client devices, either by erasure or otherwise during or shortly after playing the coherent digital content.

In an alternative preferred embodiment, the extracted media content may be encrypted prior to transmitting it to the one or more client devices for playing the coherent digital content. Encryption software and/or the encrypted data, and a decryption key may be made available, such as for a short period during play, to authorized client devices to enable playing of the coherent digital content.

BRIEF DESCRIPTION OF THE DRAWINGS

The novel features which are characteristic of the invention are set forth in the appended claims. The invention itself, however, together with further objects and attendant advantages thereof, will be best understood by reference to the following description taken in connection with the accompanying drawings, in which:

FIG. 3 is a flowchart showing the logical flow of delivery and play of digital content according to a preferred embodiment of the invention.

DETAILED DESCRIPTION OF THE PREFERRED EMBODIMENTS

Figure 1:
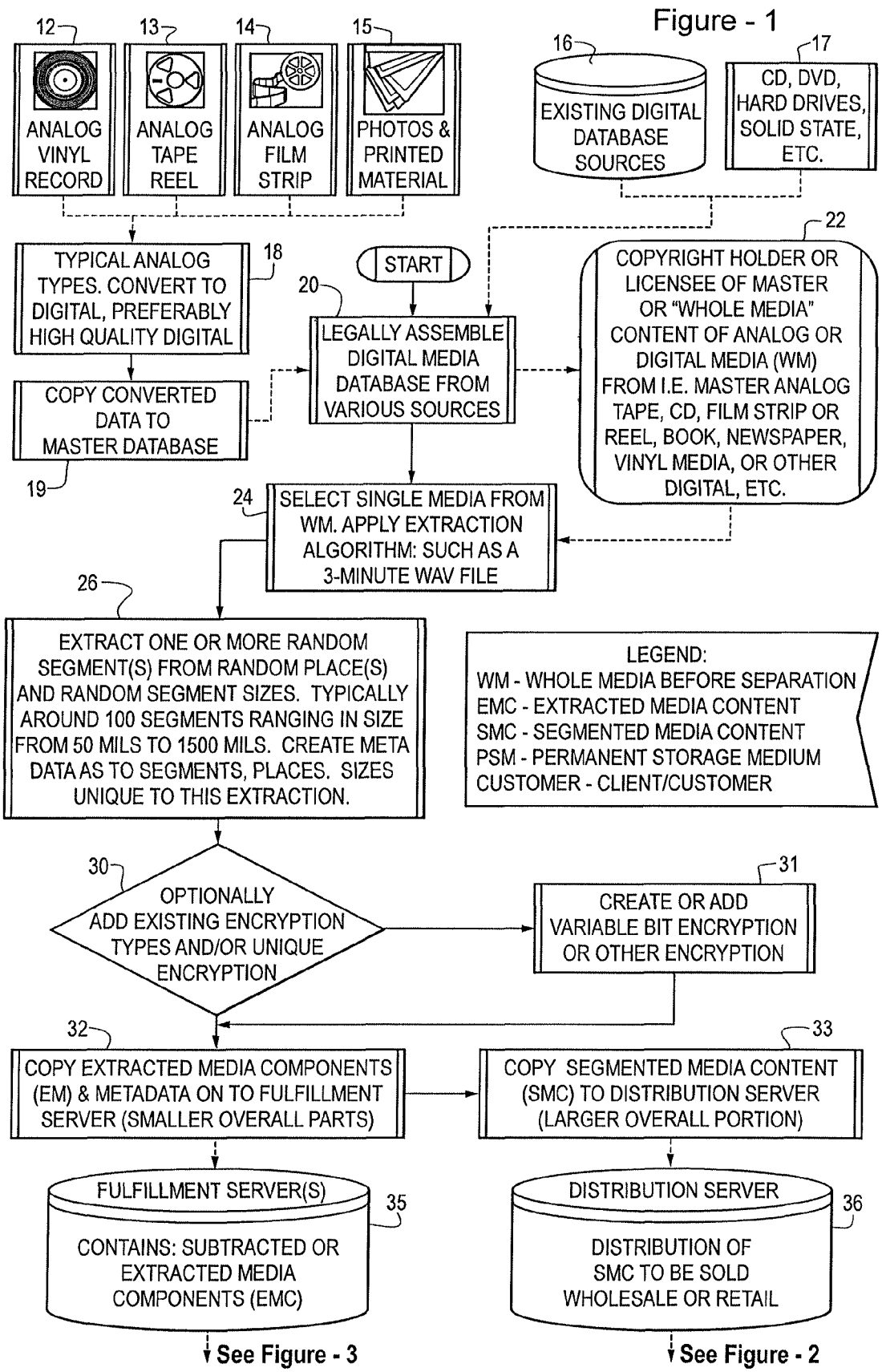
FIG. 1 is a flowchart showing an exemplary embodiment in which digital media content such as music may, according to a preferred embodiment of the present invention, be downloaded and distributed, via a distribution system, to customers.

Set forth below is a description of what are believed to be the preferred embodiments and/or best examples of the invention claimed. Future and present alternatives and modifications to this preferred embodiment are contemplated. Any alternatives or modifications which make insubstantial changes in function, in purpose, in structure, or in result are intended to be covered by the claims of this patent.

In one preferred embodiment of the present invention, if a song or other digital media content has been licensed from an owner of the "virtual music box" ("VMB"), for example, the VMB could store portions of the licensed digital media content, which could include missing gap portions. (In a preferred embodiment, the missing gap portions would constitute a sufficiently large part of the digital media content so as to make their omission from the played content sufficiently noticeable, to discourage unauthorized copying.) These missing gaps may be stored on a "fulfillment" server(s) and downloaded in real-time so that when an individual request to listen to a particular (e.g.) song is made, the portion of the song being played becomes "coherent" (i.e., the entire digital content of the song is played, without interruptions or gaps); at the same time, for security and to protect the licensed nature of the digital content, the individual downloading the song is not able to save or store the entire coherent digital content. As a condition precedent to playing the coherent song with the missing gaps, a licensing authorization step would take place. A detailed description of how preferred examples of the invention may be commercially practiced is provided below.

In one preferred embodiment, a unique algorithm may be provided for inserting the missing gaps. The gaps may vary in length, and also in their number and location. Additionally, the sequence in which missing gaps are downloaded may also be varied. For example, a given audio file could be split up using a weighed distribution, with three randomly-placed, not necessarily contiguous, files that are (e.g.) 3-13% of the file size. A left-sided distribution of minor pieces to be removed could then be created. In place of all the pieces removed, blank audio could be inserted, so that the total file sizes of the original and the unique split are the same. In the preferred embodiment, the algorithm for removing the gaps from the master recording may be created by a random number generator, with parameters given for each gap variable (e.g., length, number, location, sequence). This would make deciphering the missing gaps exceedingly difficult, as there is essentially a unique "key" in order to "unlock" the algorithm to provide each coherent song. To provide an even higher level of security, the gaps could, alternatively, instead of silence, consist of a series of pops, clicks, whistles, etc., that would be exceedingly difficult to be removed using any known software.

A still further possibility is that the missing gaps from one song could be deployed together with the missing gaps from other songs on the VMB. In other words, every song on the VMB could have its missing parts stored within other songs in their respective gaps.

To make the system even more secure, the missing gaps for songs stored on the VMB could be stored on various servers, and a combination of two or more servers could be required to be connected in order to play any one song.

Preferably, to avoid any danger of unauthorized copying, the coherent song need not be stored on the VMB. Instead, if a song is replayed, the download and checking process may again be repeated.

In another embodiment of the invention, and as an additional security feature, the VMB could have associated with it one or more speakers that play, for example, the mid-range sounds of songs, while other spectrums of the sound range could be played through external speakers not associated with the VMB. This would require an unauthorized copier/hacker, in order to purloin the coherent song, to break into the VMB. But once the detectable seal is broken (per the description below), the entire system would not play. Therefore, the hacker could steal the stored media in the VMB, but this would be worthless without access to the fulfillment server(s).

The present invention has other applications besides audio. For example, its principles could be used to solve bandwidth limitation issues, and many other problems and limitations associated with the download of data in office/home locations, for example, as well as the security associated with new cloud limitations.

Referring now to FIG. 1, a preferred embodiment is described for distributing music to consumers according to one aspect of the invention. Master analog or digital media content (i.e., "whole" music) may be legally assembled from various sources at step 20, which sources may include: analog vinyl records 10, analog tape reels 12, analog film strips 13, photos and printed material 14, existing digital database sources 16 and CDs, DVDs, hard drives, solid state content, etc., 17. Analog content may be converted to digital content at step 18, and this digital content may be copied to a master database at step 19. The master database(s) of authorized digital media content compiled from various sources may be assembled at step 20 and the entire content or portions thereof may be transferred to any authorized holder at 22. Now, a request may be made by an authorized user (e.g., a consumer) to download and play individual digital media content such as a song, at step 24. An appropriate extraction algorithm may be used, and in step 26 the media content may be divided into SMC and EMC, such as by using randomly generated algorithms to do so. (As one example, about 100 segments ranging in size from 50-1500 mils may be used; corresponding metadata may also be created to indicate the segment size and placement unique to the particular extraction, for example.) Variable sizes and segments ("gaps") of musical content may now be removed from the music. Optionally, instead of leaving the EMC gaps as silences, some or all of the gaps could be replaced with an array of sounds (e.g., whistles, static, etc.). The metadata at step 26 could still function similarly when the rejoining (SMC+ECM) process is performed.

Still referring to FIG. 1, at optional steps 30/31, the ESM and/or SMC could be encrypted, such as by using existing encryption techniques, or by using variable bit or other unique encryption techniques. Now, in a preferred embodiment, at steps 32 and 33, the EMC (e.g., smaller overall portion) and corresponding meta data may be copied to fulfillment server(s) 35, while the SMC (e.g., larger overall portion) may be transmitted to distribution server(s) 36 (preferably by physical delivery on physical media such as solid-state chips or discs, given the bandwidth limitations incident with Internet delivery). Distribution server 36 may be used to distribute the SMC for wholesale or retail sale. Customers or clients who licensed or purchased the partial media content may then download their complete music as described in FIGS. 2 and 3, below.

Still referring to FIG. 1, preferably multiple fulfillment servers 35 are used, as this would have several benefits, including redundancy, load balancing, etc. This can also serve as an extra layer of encryption by spreading parts of each EMC over separate fulfillment servers 35.

Figure 2:
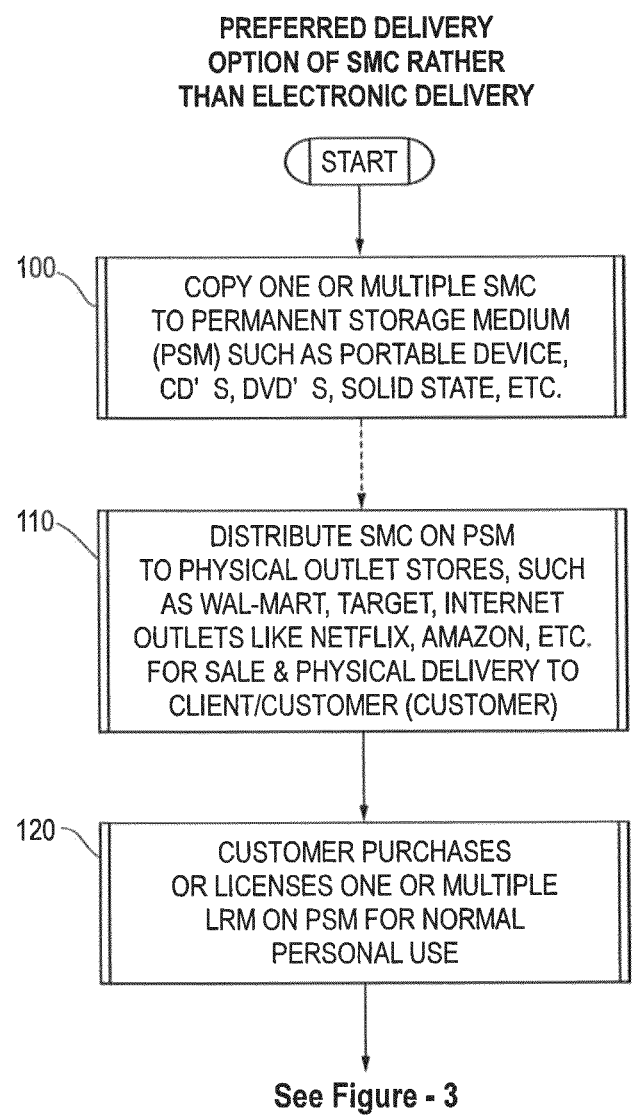
FIG. 2 is a flowchart showing a preferred delivery mechanism.

Referring now to FIG. 2, a preferred delivery option for the SMC is disclosed. Rather than electronic delivery, such as over the Internet, given existing bandwidth limitations, the SMC may be copied to permanent storage medium (PSM), such as portable devices like CDs, DVDs, solid-state chips, etc., at step 111. The SMC may be distributed at step 114, on PSM to physical outlet stores (e.g., Wal-Mart, Target) as well as to Internet outlets (e.g., Netflix, Amazon.com) for sale and physical delivery to customers. Finally, at step 117, the customer may purchase and/or license one or more licensed SMCs on PSM for personal use.

Referring now to FIG. 3, a licensed customer or client may now use his/her computer or other digital device to electronically access the fulfillment server(s) controller 205 and reassemble the missing gaps into their correct order, determining the exact point of insertion "on the fly" as the song or other content is playing, discarding (not saving) the missing gap as it is played. The customer may, for example, supply a unique Customer ID which may be checked at step 210. The customer request may also include requests to the fulfillment server(s) controller 205 for one or more of the following: the "split" version (EMC) of particular digital content, such as a particular song; the parameters of a particular audio file corresponding to the requested song; the list of songs a particular client can play; and the song list details (e.g., the number of songs, the hash of the song list to check against, etc.). To check the validity of the customer/client request, fulfillment server(s) controller 205 may send the request at step 210. If the request is denied, a message may transmit the denial at step 215, and the reason for denial may be provided to the customer/client at 223. If the client ID is authorized, the request may be authorized at step 220, releasing the fulfillment server(s) 35 to retrieve the appropriate missing gaps/EMC using (e.g.) the ID number for that song or other digital content that is about to commence playing and forward them, along with the corresponding decryption decoder information, if any, to the client computer or other digital device at step 223.

If the response is denied at step 217, the reason for the denial (e.g., lack of funds, failure to authenticate customer ID, etc.) is transmitted to the customer's player, and the customer may be given an opportunity to overcome the denial (e.g., by paying the required funds, providing an authentic customer ID, etc.). Upon proper validation at step 224, metadata and missing content to replace the missing gaps, along with instructions on how to do so and where, may be provided at 230. Also at step 230, for security reasons, the EMC and unique decoder information may be erased on the client computer or other digital device during or immediately following play of the requested digital content. If the response is invalid, a notification of a request error is provided at step 217, and the process again ends.

Optionally, the initial request at step 205 may be permanently blocked, or blocked based on time-sensitive variables, for example, by blocking the player from proceeding if more than a predetermined number of invalid attempts are made. If the request is valid, play continues and gaps are returned temporarily to allow normal play for that request, as described above. In a preferred embodiment, the SMC may play coherently for (e.g.) 15 seconds (a recommended variable of the SMC is that it has no gaps at the beginning). The process may be repeated for any song or other digital media content that the customer/player has purchased/licensed and has been loaded into the customer's player.

As part of the process, royalty fees may also be calculated and deducted based on any applicable royalty or license agreement.

The above description is not intended to limit the meaning of the words used in the following claims that define the invention. For example, while preferred embodiments have been described above, persons of ordinary skill in the art will understand that a variety of other designs still falling within the scope of the following claims may be envisioned and used. It is contemplated that future modifications in structure, function or result will exist that are not substantial changes and that all such insubstantial changes in what is claimed are intended to be covered by the claims.

I claim:

1. A method for securely playing coherent digital content and preventing its play by unauthorized users, the coherent digital content comprising extracted media content and segmented media content, comprising the steps of:

providing one or more storage devices comprising portable storage media and made available to one or more client devices, the portable storage media receiving and storing incoherent digital content comprising the segmented media content, wherein the segmented media content has predetermined gaps comprising audio distortion;

upon the one or more client devices obtaining authorization of entitlement to receive the coherent digital content, temporarily returning and merging the extracted media content with the segmented media content using information comprising one or more reassembly algorithms transmitted over at least the Internet to the one or more client devices and instructing the merger of the extracted media content within the predetermined gaps of the segmented media content, the use of which enables a temporary reconstitution of the extracted media content with the segmented media content to enable playing or execution of the reconstituted coherent digital content by the one or more authorized client devices, wherein at least one of the extracted media content and the one or more reassembly algorithms do not remain permanently available to the one or more authorized client devices after playing or execution of the reconstituted coherent digital content.

2. The method of claim 1, wherein the digital content comprises music.

3. The method of claim 1, wherein the one or more client devices comprise a computer or other digital device.

4. The method of claim 1, further comprising the step of erasing the extracted media content from the memory of the one or more client devices during or immediately after playing the coherent digital content.

5. The method of claim 1, further comprising the step of distributing the portable storage media to consumers purchasing a license to use the coherent digital media.

6. The method of claim 1, further comprising the step of providing one or more fulfillment servers having the extracted media content.

7. The method of claim 1, further comprising one or more distribution servers for facilitating the distribution of the segmented media content to authorized users.

8. The method of claim 1 for securely playing coherent digital content and preventing its play by unauthorized users, wherein the extracted media content forms a minority portion of the coherent digital content, and segmented media content forms a majority portion of the coherent digital content, and wherein at least some of the information comprising one or more reassembly algorithms is also provided by a server network.

9. The method of claim 8, further comprising the steps of encrypting the extracted media content prior to its decryption and transmission to the one or more client devices for its temporary use in playing the coherent digital content.

10. The method of claim 1, wherein the one or more storage devices include or communicate with one or more servers.

11. The method of claim 1, further comprising the step of inserting foreign material not forming a part of the coherent digital content.

12. The method of claim 8, further comprising the step of erasing the extracted media content from the one or more client device during or shortly after playing the coherent digital content.

13. The method of claim 8, wherein the portable storage media comprises one or more of the following: solid-state data storage devices, CDs or DVDs.

14. The method of claim 1, wherein the audio distortion comprises one or more of an array of sounds.

15. The method of claim 1, wherein the audio distortion comprises one or more of the following: pops, clicks, whistles, static or silence.

* * * * *